(12) United States Patent
Remy

(10) Patent No.: US 9,860,227 B2
(45) Date of Patent: Jan. 2, 2018

(54) IDENTIFYING PANELISTS BASED ON INPUT INTERACTION PATTERNS

(71) Applicant: Google Inc., Mountain View, CA (US)

(72) Inventor: Nicolas Remy, France (FR)

(73) Assignee: Google LLC, Mountain View, CA (US)

( * ) Notice: Subject to any disclaimer, the term of this patent is extended or adjusted under 35 U.S.C. 154(b) by 138 days.

(21) Appl. No.: 14/851,757

(22) Filed: Sep. 11, 2015

(65) Prior Publication Data

US 2017/0078257 A1  Mar. 16, 2017

(51) Int. Cl.
| | |
|---|---|
| *H04L 29/06* | (2006.01) |
| *G06N 5/04* | (2006.01) |
| *G06F 21/31* | (2013.01) |
| *G06Q 10/00* | (2012.01) |

(52) U.S. Cl.
CPC ............ *H04L 63/08* (2013.01); *G06F 21/316* (2013.01); *G06N 5/047* (2013.01); *G06Q 10/00* (2013.01)

(58) Field of Classification Search
CPC ........ G06F 21/32; G06F 21/316; G06F 3/017; H04L 63/0861; H04L 63/083
USPC ........................................................ 726/28
See application file for complete search history.

(56) References Cited

U.S. PATENT DOCUMENTS

| | | |
|---|---|---|
| 8,230,232 B2 | 7/2012 | Ahmed et al. |
| 8,751,461 B2 | 6/2014 | Abraham et al. |
| 8,843,754 B2 | 9/2014 | Alward et al. |
| 8,892,461 B2 | 11/2014 | Lau et al. |
| 2005/0008148 A1* | 1/2005 | Jacobson ................. G06F 3/038 380/26 |
| 2006/0021003 A1* | 1/2006 | Fisher ..................... G06F 21/32 726/1 |
| 2010/0225443 A1* | 9/2010 | Bayram ................. G06F 21/316 340/5.83 |
| 2016/0006730 A1* | 1/2016 | Chari ..................... G06F 21/32 726/7 |

FOREIGN PATENT DOCUMENTS

EP  2 418 820 A2  2/2012

OTHER PUBLICATIONS

Frank, Mario, et al. "Touchalytics: On the applicability of touchscreen input as a behavioral biometric for continuous authentication." IEEE transactions on information forensics and security 8.1 (2013): 136-148.*
International Search Report & Written Opinion for PCT/US2016/049445 dated Oct. 19, 2016.

* cited by examiner

*Primary Examiner* — Syed Zaidi
(74) *Attorney, Agent, or Firm* — Foley & Lardner LLP

(57) ABSTRACT

A panelist identification device for determining an identity of a panelist based on an input interaction pattern of the panelist is provided. Additionally, a method for determining an identity of a panelist based on an input interaction pattern of the panelist is provided. Further, a computer-readable storage device having processor-executable instructions embodied thereon is provided. The instructions are for determining an identity of a panelist based on an input interaction pattern of the panelist.

18 Claims, 8 Drawing Sheets

IDENTIFYING PANELISTS BASED ON INPUT INTERACTION PATTERNS

BACKGROUND

This description relates to identifying panelists to a panelist reporting system, and more specifically to identifying the panelists based on input interaction patterns of the panelists.

Accurately measuring what content items people viewed online is important in quantifying the effectiveness of transmitting content items to people through online mediums (e.g., web pages) rather than through other mediums, such as television. Such measurements are typically done by hiring a panel of users, and metering what they do online. For this approach to work, each panelist must follow a set of rules. In particular, each time the panelist uses a computing device to view content items online, the panelist must log in with a particular panelist identifier, and then sign-out when the panelist is done viewing content items online. These rules quickly become a hassle in everyday life, and panelists fail to log in and log out in accordance with the rules. In a household with two or more panelists, this can quickly lead to low quality measurements, when for example panelist A logs in, leaves his session open, and panelist B uses the computing device but does not sign-in. Accordingly, in such situations, the activity of panelist B is recorded as panelist A's activity.

BRIEF DESCRIPTION OF DISCLOSURE

In one aspect, a panelist identification device for determining an identity of a panelist based on an input interaction pattern of the panelist is provided. The panelist identification device includes a processor coupled to a panelist input device. The panelist identification device is communicatively coupled to a panelist reporting system. The processor is configured to receive a first panelist identifier from a first panelist at a first time. The processor is additionally configured to authenticate the first panelist to the panelist reporting system based on the first panelist identifier. Additionally, the processor is configured to, while the first panelist is authenticated to the panelist reporting system, receive at least a first input from the first panelist through the panelist input device. Further, the processor is configured to identify a first input interaction pattern of the first panelist based at least in part on the first input. Additionally, the processor is configured to receive a candidate input at a second time through the panelist input device. The second time is subsequent to the first time. Additionally, the processor is configured to identify a candidate input interaction pattern based on the candidate input and determine that the candidate input interaction pattern satisfies a threshold level of similarity to the first input interaction pattern. The processor is additionally configured to authenticate the first panelist to the panelist reporting system in response to determining that the candidate input interaction pattern satisfies the threshold level of similarity to the first input interaction pattern.

In another aspect, a method for determining an identity of a panelist based on an input interaction pattern of the panelist is provided. The method is implemented by a panelist identification device that includes a processor coupled to a panelist input device. The panelist identification device is communicatively coupled to a panelist reporting system. The method includes receiving, by the panelist identification device, a first panelist identifier from a first panelist at a first time. The method also includes authenticating, by the panelist identification device, the first panelist to the panelist reporting system based on the first panelist identifier. Additionally, the method includes, while the first panelist is authenticated to the panelist reporting system, receiving, by the panelist identification device, at least a first input from the first panelist through the panelist input device. The method additionally includes identifying, by the panelist identification device, a first input interaction pattern of the first panelist based at least in part on the first input. Additionally, the method includes receiving, by the panelist identification device, a candidate input at a second time through the panelist input device, wherein the second time is subsequent to the first time. The method also includes identifying, by the panelist identification device, a candidate input interaction pattern based on the candidate input and determining, by the panelist identification device, that the candidate input interaction pattern satisfies a threshold level of similarity to the first input interaction pattern. Additionally, the method includes authenticating, by the panelist identification device, the first panelist to the panelist reporting system in response to determining that the candidate input interaction pattern satisfies the threshold level of similarity to the first input interaction pattern.

In another aspect, a computer-readable storage device having processor-executable instructions embodied thereon is provided. The instructions are for determining an identity of a panelist based on an input interaction pattern of the panelist. When executed by a panelist identification device that includes a processor coupled to a panelist input device and communicatively coupled to a panelist reporting system, the processor-executable instructions cause the panelist identification device to receive a first panelist identifier from a first panelist at a first time, authenticate the first panelist to the panelist reporting system based on the first panelist identifier, while the first panelist is authenticated to the panelist reporting system, receive at least a first input from the first panelist through the panelist input device, identify a first input interaction pattern of the first panelist based at least in part on the first input, subsequently receive a candidate input at a second time, and determine that the candidate input was entered by the first panelist based on the first input interaction pattern.

In another aspect, a panelist identification device for determining an identity of a panelist based on an input interaction pattern of the panelist is provided. The panelist identification device is communicatively coupled to an input device and to a panelist reporting system. The panelist identification device includes means for receiving a first panelist identifier from a first panelist at a first time. The panelist identification device additionally includes means for authenticating the first panelist to the panelist reporting system based on the first panelist identifier. Additionally, the panelist identification device includes means for, while the first panelist is authenticated to the panelist reporting system, receiving at least a first input from the first panelist through the panelist input device. Further, the panelist identification device includes means for identifying a first input interaction pattern of the first panelist based at least in part on the first input. Additionally, the panelist identification device includes means for receiving a candidate input at a second time through the panelist input device. The second time is subsequent to the first time. Additionally, the panelist identification device includes means for identifying a candidate input interaction pattern based on the candidate input. Additionally, the panelist identification device includes means for determining that the candidate input interaction pattern satisfies a threshold level of similarity to the first input interaction pattern. The panelist identification device additionally includes means for authenticating the first panelist to the panelist reporting system in response to determining that the candidate input interaction pattern satisfies the threshold level of similarity to the first input interaction pattern.

In another aspect, the panelist identification device described above is provided, further including means for receiving the candidate input at the second time through the panelist input device when the first panelist is not authenticated to the panelist reporting system. In another aspect, the panelist identification device described above is provided, further including means for determining that the candidate input interaction pattern satisfies a threshold level of similarity to the first input interaction pattern using a statistical model. In another aspect, the panelist identification device described above is provided, further including means for training a statistical classification device to identify the first panelist based at least on the first input and the first panelist identifier, and means for training the statistical classification device to identify a second panelist based at least on a second input received through the panelist input device while the second panelist is authenticated to the panelist reporting system. In another aspect, the panelist identification device described above is provided, further including means for determining that the candidate input interaction pattern satisfies the threshold level of similarity by generating a first panelist input interaction pattern profile, determining a similarity score by comparing the candidate input interaction pattern to the input interaction pattern profile, and determining that the similarity score exceeds a predefined threshold value.

In another aspect, the panelist identification device described above is provided, further including means for identifying the first input interaction pattern by identifying a typing speed. In another aspect, the panelist identification device described above is provided, further including means for identifying the first input interaction pattern by identifying a length of swipes through a touchscreen included in the panelist input device. In another aspect, the panelist identification device described above is provided, further including means for identifying the first input interaction pattern by identifying a frequency of typographical errors generated through inputs received through the panelist input device. In another aspect, the panelist identification device described above is provided, further including means for identifying the first input interaction pattern by identifying a movement speed of a pointing device included in the panelist input device. In another aspect, the panelist identification device described above is provided, further including means for identifying the first input interaction pattern by identifying a speed that a double tap or double click is performed through the panelist input device. In another aspect, the panelist identification device described above is provided, further including means for identifying the first input interaction pattern by identifying a speed of clicks performed through the panelist input device. In another aspect, the panelist identification device described above is provided, further including means for identifying a fingerprint or thumbprint through the panelist input device.

The features, functions, and advantages described herein may be achieved independently in various embodiments of the present disclosure or may be combined in yet other embodiments, further details of which may be seen with reference to the following description and drawings.

Figure 1:
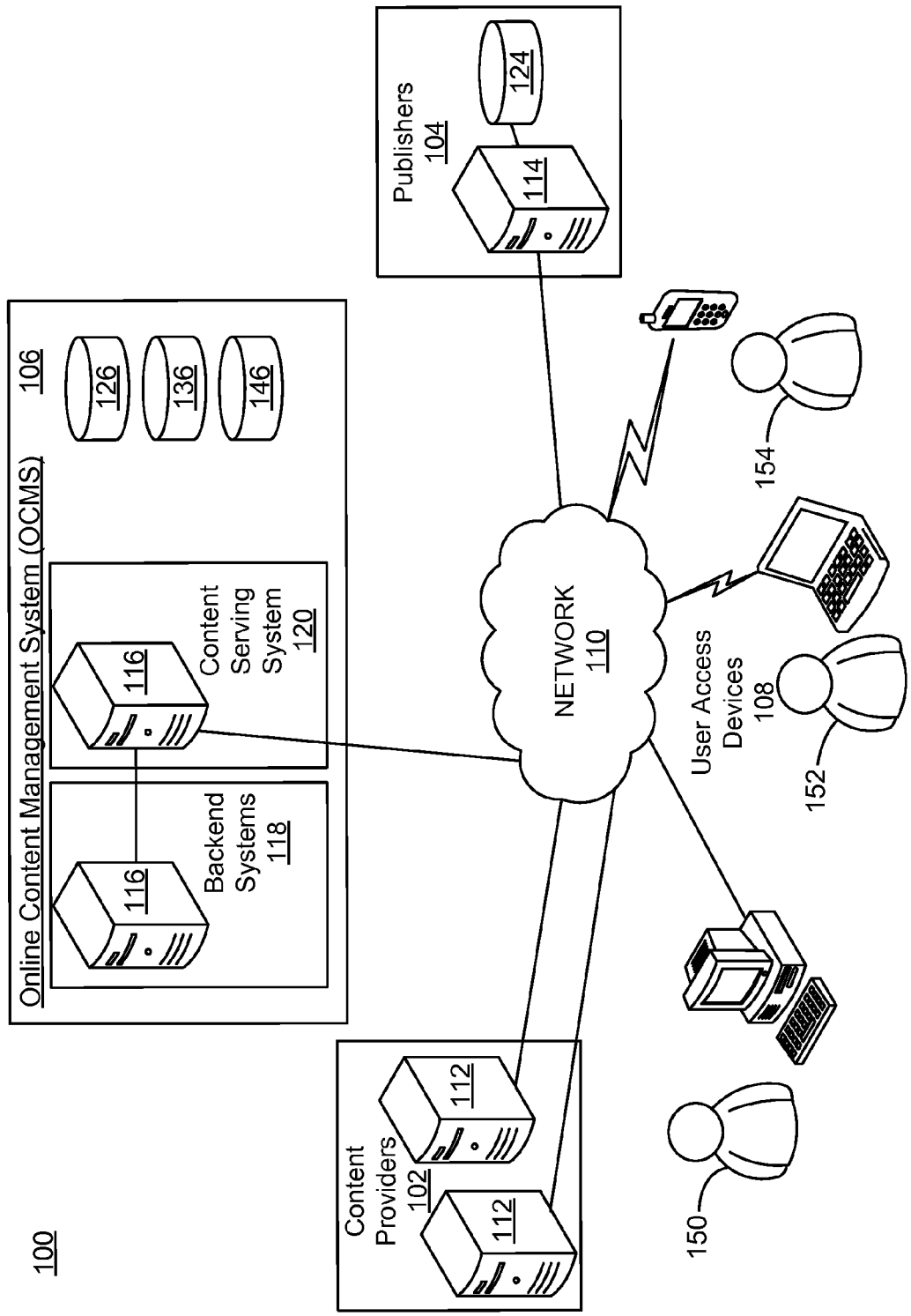
FIG. 1 is a diagram depicting an example networked environment.

Although specific features of various embodiments may be shown in some drawings and not in others, this is for convenience only. Any feature of any drawing may be referenced and/or claimed in combination with any feature of any other drawing.

DETAILED DESCRIPTION OF DISCLOSURE

The following detailed description of implementations refers to the accompanying drawings. The same reference numbers in different drawings may identify the same or similar elements. Also, the following detailed description does not limit the claims.

A panelist identification device described herein ends the reliance on a panelist affirmatively identifying himself or herself, and instead uses characteristics of the panelist's input interaction patterns (e.g., mouse movements, touch gestures, and/or keyboard interactions) to recognize the panelist who is currently using the panelist identification device.

A panelist identification device for determining an identity of a panelist based on an input interaction pattern of the panelist is provided. The panelist identification device includes a processor coupled to a panelist input device. The panelist identification device is communicatively coupled to a panelist reporting system. The processor is configured to receive a first panelist identifier from a first panelist at a first time. Additionally, the panelist identification device is configured to authenticate the first panelist to the panelist reporting system based on the first panelist identifier. While the first panelist is authenticated to the panelist reporting system, the panelist identification system receives at least a first input from the first panelist through the panelist input device. The panelist identification system then identifies a first input interaction pattern of the first panelist based at least in part on the first input. Further, the panelist identification system receives a candidate input at a second time through the panelist input device. The second time is subsequent to the first time. At least in some implementations, the first panelist is no longer authenticated to the panelist reporting system (e.g., the first panelist has logged out) during the second time. The panelist identification system identifies a candidate input interaction pattern based on the candidate input. The panelist identification device then determines that the candidate input interaction pattern satisfies a threshold level of similarity to the first input interaction pattern. Additionally, the panelist identification device authenticates the first panelist to the panelist reporting system in response to determining that the candidate input interaction pattern satisfies the threshold level of similarity to the first input interaction pattern.

In some implementations, the panelist identification device includes a statistical classification device that determines that the candidate input interaction pattern satisfies a threshold level of similarity to the first input interaction pattern using a statistical model. In some implementations, the panelist identification device trains the statistical classification device to identify the first panelist based on at least the first input and the first panelist identifier. Additionally, the panelist identification device trains the statistical classification device to identify a second panelist based at least on second input received through the panelist input device while the second panelist is authenticated to the panelist reporting system. In some implementations, the panelist identification device determines that the candidate input interaction pattern satisfies the threshold level of similarity by generating a first panelist input interaction pattern profile, determining a similarity score by comparing the candidate input interaction pattern to the input interaction pattern profile, and determining that the similarity score exceeds a predefined threshold value.

In some embodiments, the panelist identification device identifies the first input interaction pattern by identifying a typing speed of the panelist. In some implementations, the panelist identification device identifies the first input interaction pattern by identifying a length of swipes through a touchscreen included in the panelist input device. In some implementations, the panelist identification device identifies the first input interaction pattern by identifying a frequency of typographical errors generated through inputs received through the panelist input device. In some embodiments, the panelist identification device identifies the first input interaction pattern by identifying a movement speed of a pointing device included in the panelist input device. Further, in some embodiments, the panelist identification device identifies the first input interaction pattern by identifying a speed that a double tap or double click is performed through the panelist input device. In some implementations, the panelist identification device identifies the first input interaction pattern by identifying a speed of clicks performed through the panelist input device. In some implementations, the panelist identification device identifies a fingerprint or thumbprint through the panelist input device.

In situations in which the systems discussed herein collect personal information about users, or may make use of personal information, the users may be provided with an opportunity to control whether programs or features collect user information (e.g., information about a user's social network, social actions or activities, profession, interests, preferences, or current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined Thus, the user may have control over how information is collected about the user and used by a content server.

As used herein, an element or step recited in the singular and preceded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect is achieved by performing at least one of: (a) receiving a first panelist identifier from a first panelist at a first time; (b) authenticating the first panelist to a panelist reporting system based on the first panelist identifier; (c) while the first panelist is authenticated to the panelist reporting system, receiving at least a first input from the first panelist through a panelist input device; (d) identifying a first input interaction pattern of the first panelist based at least in part on the first input; (e) receiving a candidate input at a second time through the panelist input device, wherein the second time is subsequent to the first time; (f) identifying a candidate input interaction pattern based on the candidate input; (g) determining that the candidate input interaction pattern satisfies a threshold level of similarity to the first input interaction pattern; and (h) authenticating the first panelist to the panelist reporting system in response to determining that the candidate input interaction pattern satisfies the threshold level of similarity to the first input interaction pattern.

The technical effects described herein provide the technical advantage of enabling a panelist identification system to analyze characteristics of input signals received through an input device and determine, from the characteristics of the input signals, a corresponding identity of a panelist using the panelist identification system. Accordingly, the systems and processes described herein eliminate a problem that is specific to the field of electronic collection of data using a shared panelist identification device, namely the reliance on human operators (e.g., panelists) to affirmatively log in and log out of the panelist identification device in order for panelist data collected at any given time to be associated with the panelist that actually generated the data.

FIG. 1 is a diagram depicting an example networked environment. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, merchants, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. A publisher 104 may also be a content provider 102.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and interaction, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
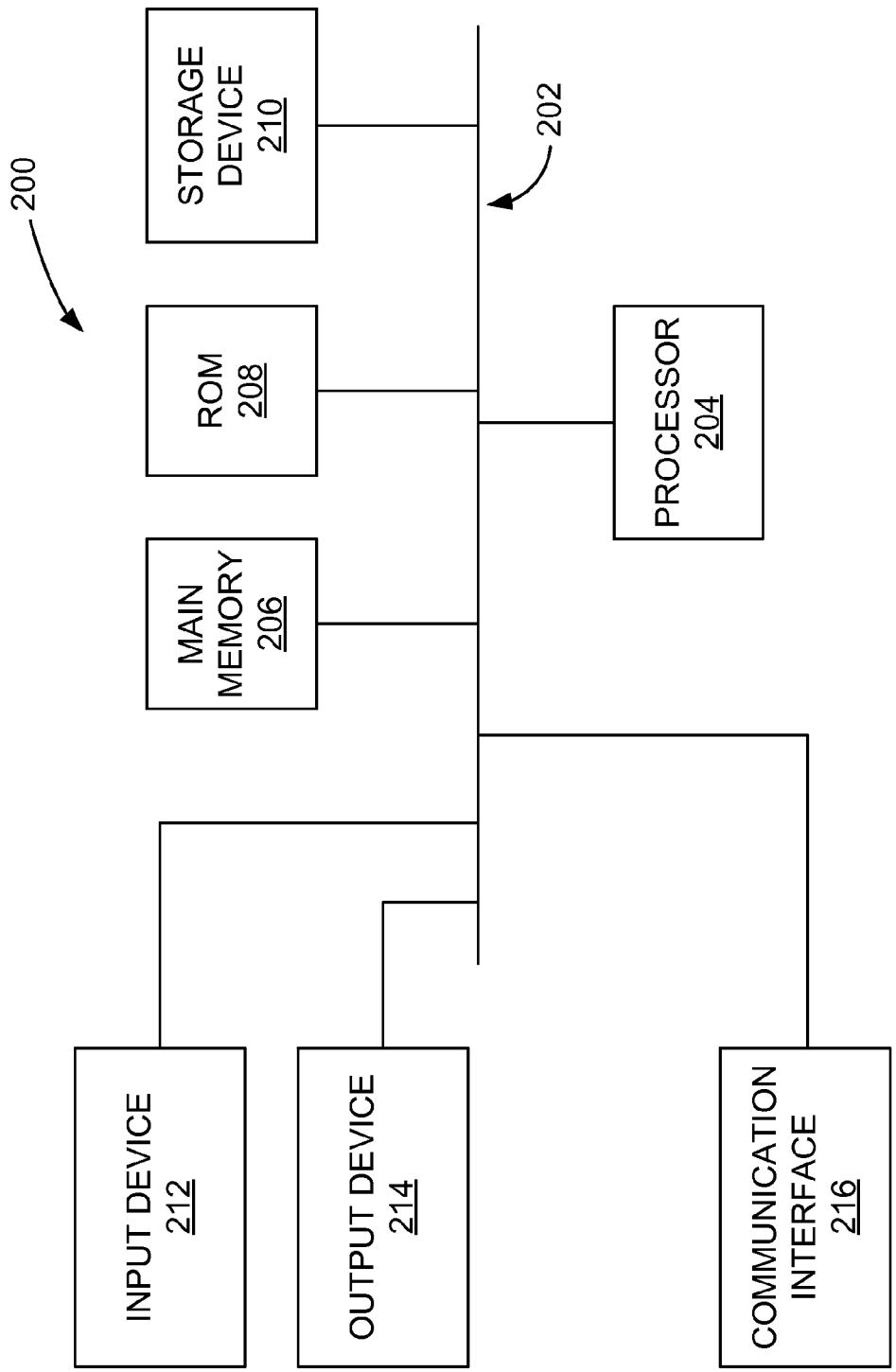
FIG. 2 is a diagram of an example computing device that is used in the environment of FIG. 1.

FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
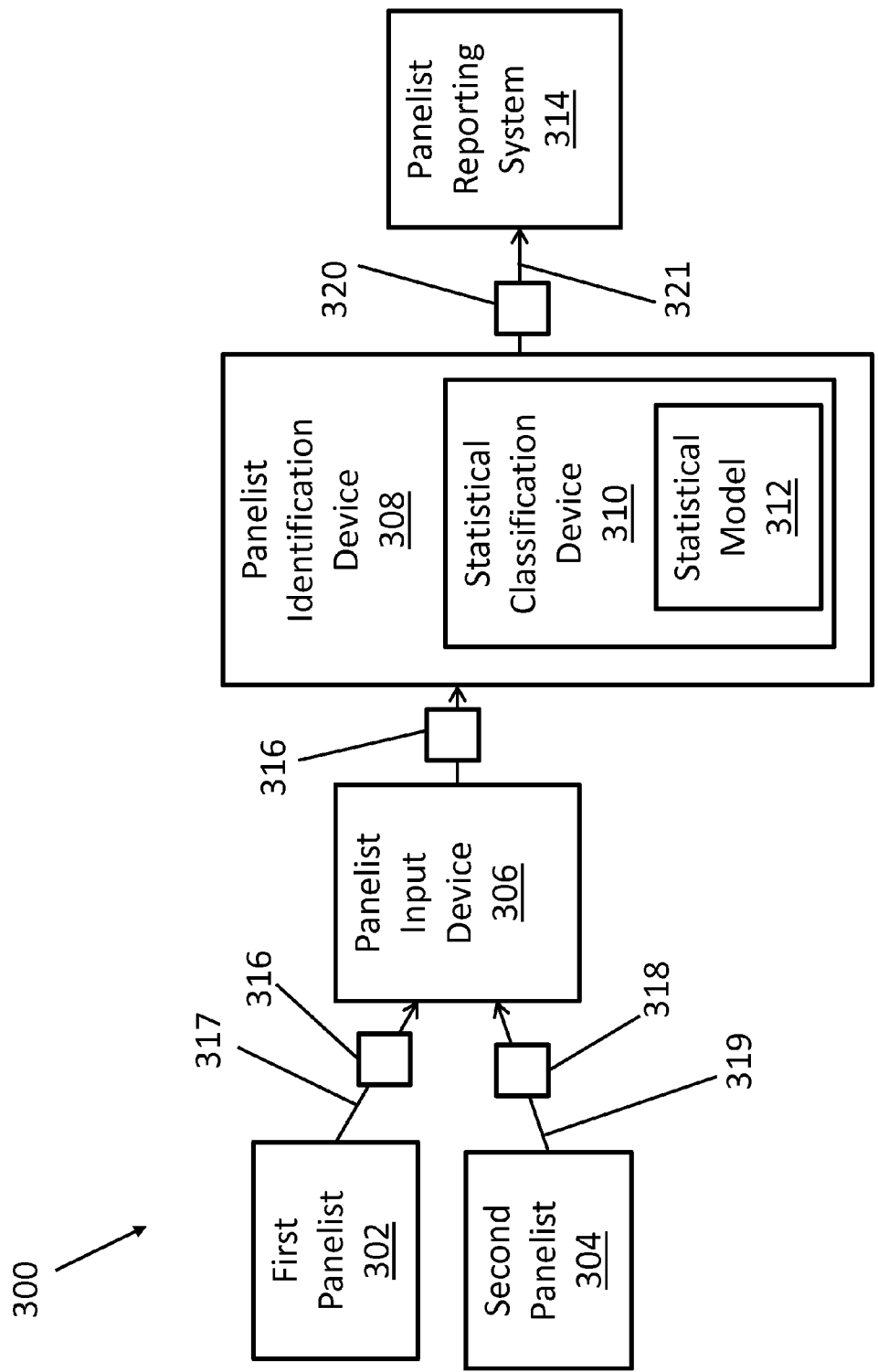
FIG. 3 is a block diagram of a data flow between a panelist input device, a panelist identification device, and a panelist reporting system operating in the networked environment shown in FIG. 1.

FIG. 3 is a block diagram of a data flow 300 between a panelist input device 306 (e.g., input device 212), a panelist identification device 308 (e.g., a user access device 108), and a panelist reporting system 314 (e.g., CMS 106) operating in networked environment 100. More specifically, a first panelist 302 (e.g., first user 150) and a second panelist 304 (e.g., second user 152) separately view content items transmitted to panelist identification device 306 and respond to the content items, for example by clicking on the content items, viewing the content items for a period of time, and/or dismissing the content items. The panelist identification device 308 reports data regarding these activities to panelist reporting system 314 for use in analyzing the effectiveness of the content items transmitted to panelist identification device 308.

In order to reliably associate the reported data with the respective panelist (e.g., first panelist 302 or second panelist 304), panelist identification device 308 must identify the panelist (e.g., first panelist 302 or second panelist 304) to reporting system 314, for example in an authentication process. Initially, for example during a first period of time such as two weeks, when first panelist 302 uses panelist identification device 308 to view and interact with content items, first panelist 302 enters a panelist identifier (e.g., a user name) using panelist input device 306. Panelist input device 306 transmits a first panelist input signal 317, including first panelist input data 316 (e.g., first panelist identifier) to panelist identification device 308. Next, panelist identification device 308 transmits an authentication signal 321 including authentication data 320 (e.g., first panelist identifier) to panelist reporting system 314. After authenticating, first panelist 302 interacts with content items, for example by clicking on them using panelist input device 306. Panelist identification device 306 receives further panelist input signals (e.g., first panelist input signal 317) including first panelist input data 316 and transmits at least a portion of the panelist input data 316 to panelist reporting system 314. Additionally, while first panelist 302 is authenticated, panelist input device 306 analyzes the first panelist input data 316 using a statistical model 312 in a statistical classification device 310 to detect characteristics of an input interaction pattern of the first panelist 302, as described in more detail herein.

First panelist 302 logs out of panelist identification device 308 and second panelist 304 subsequently logs in (e.g., authenticates) in a similar manner as that described above, transmitting second panelist input signal 319 including second panelist input data 318 to panelist identification device 308. Similarly, panelist identification device 308 detects a second input interaction pattern associated with second panelist 304 based on second panelist input data 318. As described in more detail herein, panelist identification device 308 is able to distinguish input interaction patterns from panelist input data without relying on the panelist to enter a panelist identifier. Accordingly, panelist identification device 308 develops the ability to automatically authenticate each of first panelist 302 and second panelist 304 to panelist reporting system 314 even when the panelist has not provided their corresponding panelist identifier through panelist input device 306. This is advantageous because, over time, the panelists 302 and 304 may become less regimented in logging into and out of panelist identification device 308 and first panelist 302 may inadvertently forget to log out when first panelist 302 has stopped using panelist identification device 308 and/or second panelist 304 may forget to log in when using panelist identification device 308.

Figure 4:
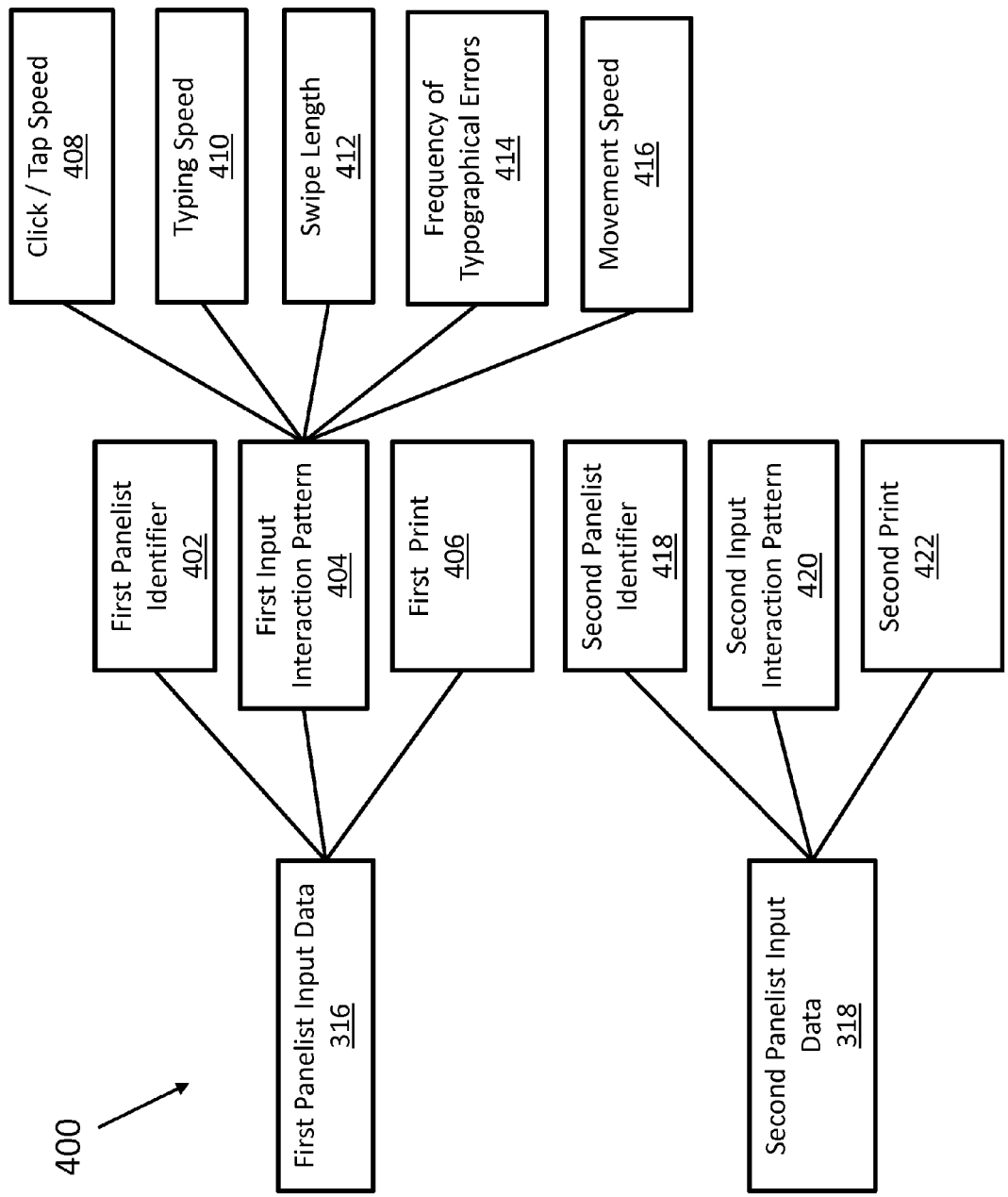
FIG. 4 is a block diagram of input data analyzed by the panelist identification device shown in FIG. 3

FIG. 4 is a block diagram 400 of input data analyzed by panelist identification device 308. More specifically, panelist identification device 308 receives a first panelist identifier 402, for example when first panelist 302 logs in using panelist input device 306. Additionally, while viewing and interacting with content items, and generally using panelist identification device 308, panelist identification device 308 identifies attributes of a first panelist input interaction pattern 404. The first panelist input interaction pattern 404 includes one or more of a click or tap speed 408 (e.g., a measure of time during which a mouse button is depressed or a finger is pressed against a touchscreen to tap on an item), a typing speed 410, a swipe length 412 (e.g., a measure of a distance that the panelist's finger is swiped across the touchscreen, for example to scroll or move a displayed item), a frequency of typographical errors 414, and a movement speed 416 (a speed at which the first panelist 302 moves a mouse or finger from one point to another). Similarly, panelist identification device 308 receives a second panelist identifier 418, for example when second panelist 304 logs in. Additionally, panelist identification device 308 detects attributes of a second input interaction pattern 420 that is associated with the second panelist 304. The attributes of the second input interaction pattern 420 include values of one or more of click or tap speed 408, typing speed 410, swipe length 412, frequency of typographical errors 414, and movement speed 416 associated with second panelist 304. Additionally, in at least some implementations in which panelist input device 306 includes a fingerprint or thumbprint scanner, panelist identification device 308 receives a first print 406 (e.g., fingerprint or thumbprint) from first panelist 302 and a second print 422 (e.g., fingerprint or thumbprint) from second panelist 304 and associates the respective prints with the respective panelist identifiers (e.g., first panelist identifier 402 and second panelist identifier 418). For example, in some implementations, first panelist not only enters first panelist identifier during the login process, but also provides his first print 406 contemporaneously with or after providing first panelist identifier 402.

Figure 5:
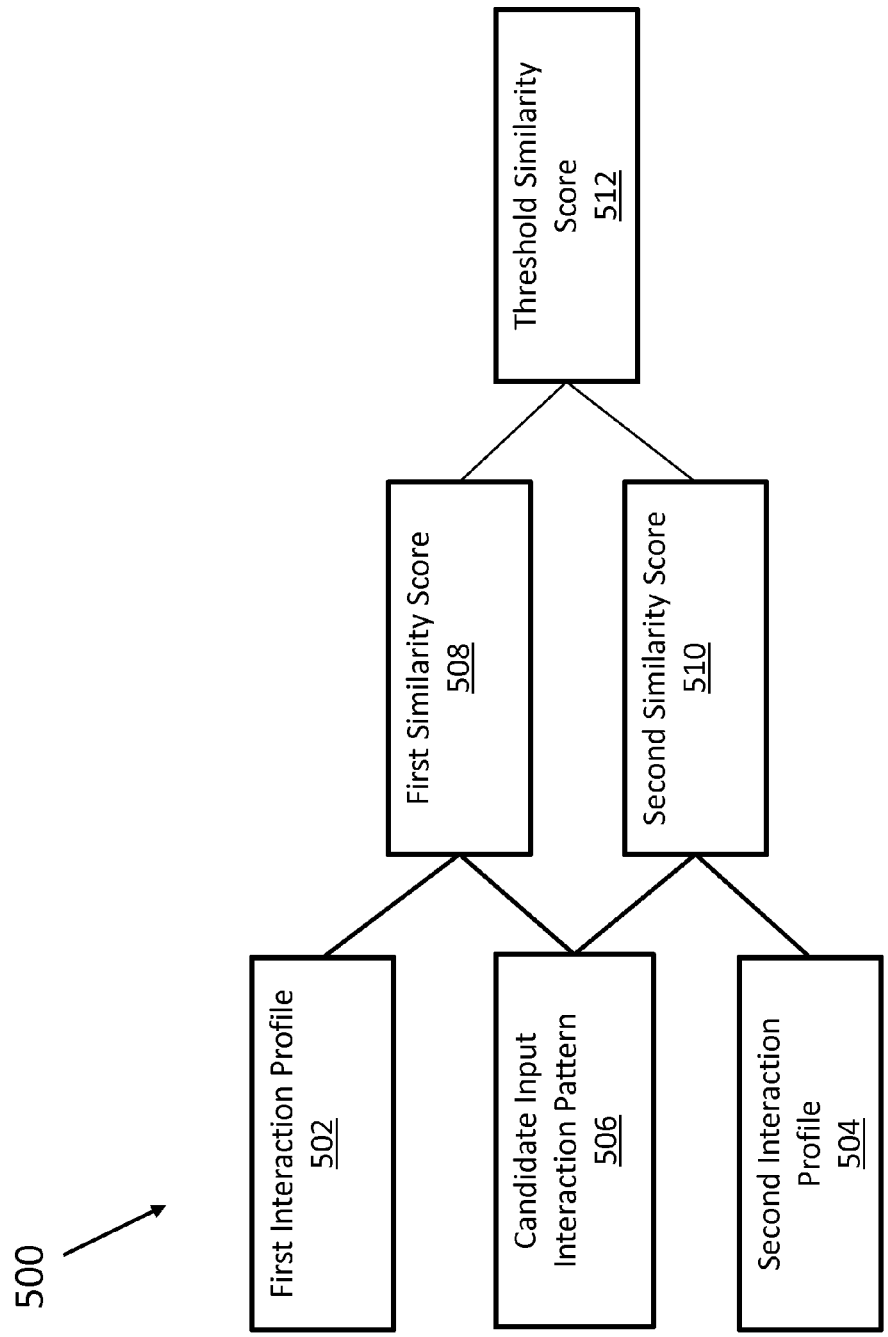
FIG. 5 is a block diagram of a data flow used by the panelist identification device to identify a panelist from an input interaction pattern.

FIG. 5 is a block diagram of an example data flow 500 used by the panelist identification device 308 to identify a panelist (e.g., first panelist 302) from input interaction pattern. In some implementations, statistical classification device 310, using statistical model 312, generates a first interaction profile 502 by detecting and averaging the attributes of first input interaction pattern 404 over time. Likewise, statistical classification device 310 generates a second interaction profile 504 by detecting and averaging the attributes of second input interaction pattern 420 over time. Subsequently, panelist identification device 308 detects a candidate input interaction pattern 506 in panelist input data, without receiving a panelist identifier (e.g., first panelist identifier 402 or second panelist identifier 418). Panelist identification device 308, and more specifically statistical classification device 310, compares the candidate input interaction pattern 506 to first interaction profile 502. More specifically, statistical classification device 310 determines, for example, that the movement speed in the candidate input interaction pattern is 95% of the movement speed in first interaction profile 502 and that the click speed is 90% of the click speed in the first interaction profile 502. Based on this comparison, statistical classification device 310 generates a first similarity score 508 representing a relatively high level of similarity between candidate input interaction pattern 506 and first interaction profile 502. Additionally, statistical classification device 310 compares the candidate input interaction pattern 506 to second interaction profile 504 and determines that the movement speed in the candidate profile is 40% of the movement speed in the second interaction profile 504 and that the click speed is 35% of the click speed in the second interaction profile 504. Based on this comparison, statistical classification device 310 generates a second similarity score 510 representing a relatively low level of similarity between candidate input interaction pattern 506 and second interaction profile 504. In other implementations, panelist identification device 308 identifies a panelist using other methods of recognizing patterns in inputs from panelists. For example, in some implementations, panelist identification device 308 does not generate similarity scores for example by comparing a candidate input interaction pattern to one or more stored interaction profiles.

Additionally, statistical classification device 310 compares first similarity score 508 to a threshold similarity score 512, which represents a relatively high degree of similarity. Further, statistical classification device 310 compares second similar score 510 to threshold similarity score 512. Statistical classification device 310 determines that first similarity score 508 satisfies threshold similarity score 512, for example by determining that first similarity score 508 is within a predefined range of threshold similarity score 512, and that second similarity score 510 does not satisfy the threshold similarity score 512 because second similarity score 510 is not within the predefined range of threshold similarity score 512. As a result of the above comparison, statistical classification device 310 determines that the candidate input interaction pattern 506 is that of first panelist 302. Accordingly, panelist identification device 308 transmits authentication data 320 to panelist reporting system 314 including first panelist identifier 402, to authenticate first panelist 302 to panelist reporting system 314 without requiring first panelist to affirmatively enter first panelist identifier 402 through panelist input device 306.

Figure 6:
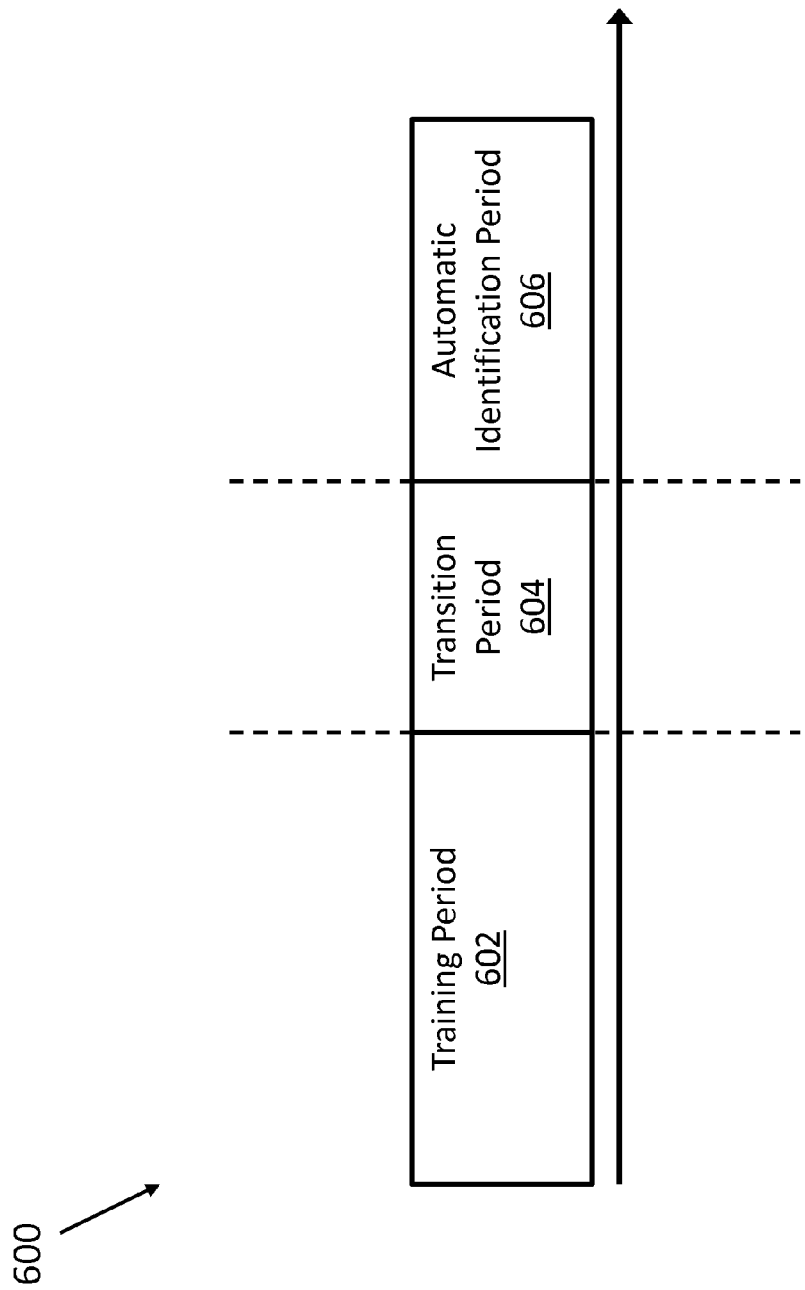
FIG. 6 is a timeline showing a transition carried out by the panelist identification device from a manual panelist login process to an automatic panelist identification process based on input interaction patterns.

FIG. 6 is a timeline 600 showing a transition carried out by panelist identification device 308 from a manual panelist login process to an automatic panelist identification process based on input interaction patterns. More specifically, as described above, first panelist 302 and second panelist 304, during training period 602, for example two weeks, enter their respective panelist identifiers as part of a manual panelist login process. During this initial time period, panelist identification device 308 is training statistical classification device 310 by detecting attributes of first input interaction pattern 404 and second input interaction pattern 420, as described above. In some implementations, panelist identification device 308 averages the values of each attribute over time and stores the averaged values in the respective input interaction pattern profiles (e.g., first interaction profile 502, associated with first panelist 302 and first panelist identifier 402, and second interaction profile 504, associated with second panelist 304 and second panelist identifier 418). In other implementations, panelist identification device 308 stores random samples of all input interactions. Next, during a transition period 604, panelist identification device 308 determines that statistical classification device 310 is able to accurately determine that a candidate input interaction pattern is associated with the panelist (e.g., first panelist 302) who manually logged in by providing their panelist identifier (e.g., first panelist identifier 402). In some implementations, panelist identification device 308 determines that statistical classification device 310 is able to accurately identify the panelist from the input interaction pattern when statistical classification device 310 makes a correct identification in a threshold percentage (e.g., 95%) of attempts.

Subsequently, an automatic identification period 606 begins in which the panelists 302 and 304 need not affirmatively enter their respective panelist identifiers in a login process. Rather, panelist identification device 308 determines which panelist (e.g., first panelist 302) is using panelist identification device 308 based on the input interaction pattern (e.g., first input interaction pattern 404) of the panelist (e.g., first panelist 302), and transmits the corresponding panelist identifier (e.g., first panelist identifier 402) to panelist reporting system 314 to authenticate the panelist (e.g., first panelist 302) to the panelist reporting system 314.

Figure 7:
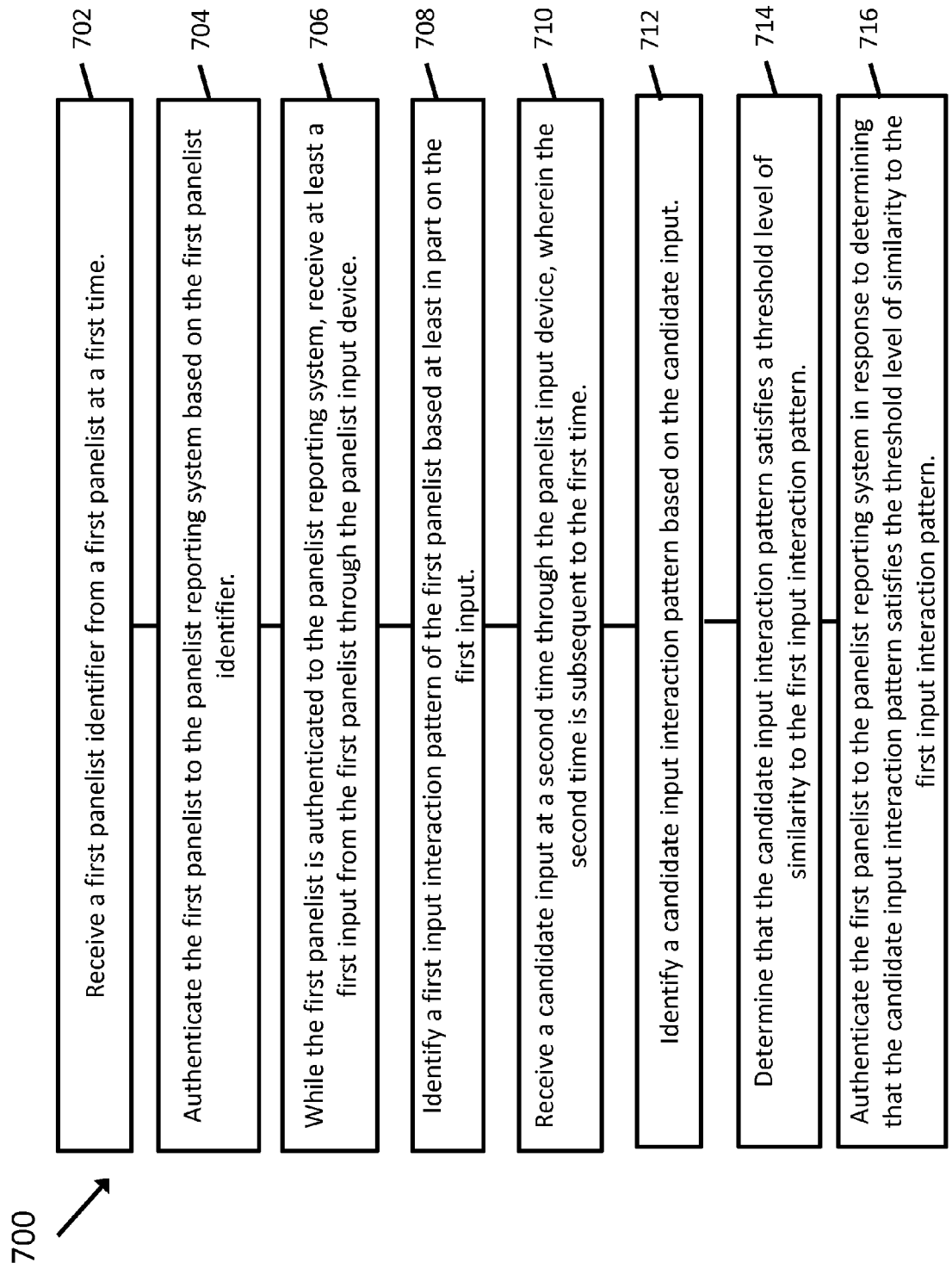
FIG. 7 is a flowchart of an example process carried out by the panelist identification device for determining an identity of a panelist based on an input interaction pattern of the panelist.

FIG. 7 is a flowchart of an example process 700 carried out by the panelist identification device 308 for determining an identity of a panelist based on an input interaction pattern of the panelist. Initially, panelist identification device 308 receives 702 a first panelist identifier 402 from a first panelist 302 at a first time (e.g., in a manual login process during training period 602). Additionally, panelist identification device 308 authenticates 704 the first panelist 302 to the panelist reporting system 314 based on the first panelist identifier 402. Further, while the first panelist 302 is authenticated to the panelist reporting system 314, panelist identification device 308 receives 706 at least a first input (e.g., first panelist input signal 317) from the first panelist 302 through the panelist input device 306. Additionally, panelist identification device 308 identifies 708 a first input interaction pattern 404 of the first panelist 302 based at least in part on the first input (e.g., first panelist input signal 317). Further, panelist identification device 308 receives 710 a candidate input (e.g., panelist input signal 317) at a second time (e.g., during automatic identification period 606) through the panelist input device 306. The second time is subsequent to the first time. Additionally, panelist identification device 308 identifies 712 a candidate input interaction pattern 506 based on the candidate input 317. Further, panelist identification device 308 determines 714 that the candidate input interaction pattern 506 satisfies a threshold level of similarity (e.g., threshold similarity score 512) to the first input interaction pattern 404. Additionally, panelist identification device 308 authenticates 716 the first panelist 302 to the panelist reporting system 314 in response to determining that the candidate input interaction pattern 506 satisfies the threshold level of similarity (e.g., threshold similarity score 512) to the first input interaction pattern 404.

In some implementations, panelist identification device 308, receives the candidate input at the second time through the panelist input device when the first panelist is not authenticated to the panelist reporting system. In some implementations, panelist identification device 308 includes a statistical classification device (e.g., statistical classification device 310) that determines that the candidate input interaction pattern 506 satisfies a threshold level of similarity (e.g., threshold similarity score 512) to the first input interaction pattern 404 using a statistical model (e.g., statistical model 312). In some embodiments, panelist identification device 308 trains the statistical classification device 310 to identify the first panelist 302 based at least on the first input (e.g., first panelist input signal 317) and the first panelist identifier 402 and trains the statistical classification device 310 to identify a second panelist (e.g., second panelist 304) based at least on second input (e.g., second panelist input signal 319) received through the panelist input device 306 while the second panelist 304 is authenticated to the panelist reporting system 314. In some implementations, panelist identification device 308 determines that the candidate input interaction pattern 506 satisfies the threshold level of similarity (e.g., threshold similarity score 512) by generating a first panelist input interaction pattern profile (e.g., first interaction profile 502), determining a similarity score (e.g., first similarity score 508) by comparing the candidate input interaction pattern 506 to the first panelist input interaction pattern profile 502 and determining that the similarity score 508 exceeds a predefined threshold value (e.g., threshold similarity score 512).

In some implementations, panelist identification device 308 identifies the first input interaction pattern 404 by identifying a typing speed 410. In some implementations, panelist identification device 308 identifies the first input interaction pattern 404 by identifying a length of swipes (e.g., swipe length 412) through a touchscreen (e.g., input device 212) included in the panelist input device 306. In some implementations, panelist identification device 308 identifies the first input interaction pattern 404 by identifying a frequency of typographical errors 414 generated through inputs received through the panelist input device 306. In some embodiments, panelist identification device 308 identifies the first input interaction pattern 404 by identifying a movement speed 416 of a pointing device (e.g., input device 212) included in the panelist input device 306. In some embodiments, panelist identification device 308 identifies the first input interaction pattern 404 by identifying a speed that a double tap or double click (e.g., click or tap speed 408) is performed through the panelist input device 306. In some embodiments, panelist identification device 308 identifies the first input interaction pattern 404 by identifying a speed of clicks (e.g., click or tap speed 408) performed through the panelist input device 306. Further, in some implementations, panelist identification device 308 identifies a fingerprint or thumbprint (e.g., first print 406) through the panelist input device 306.

Figure 8:
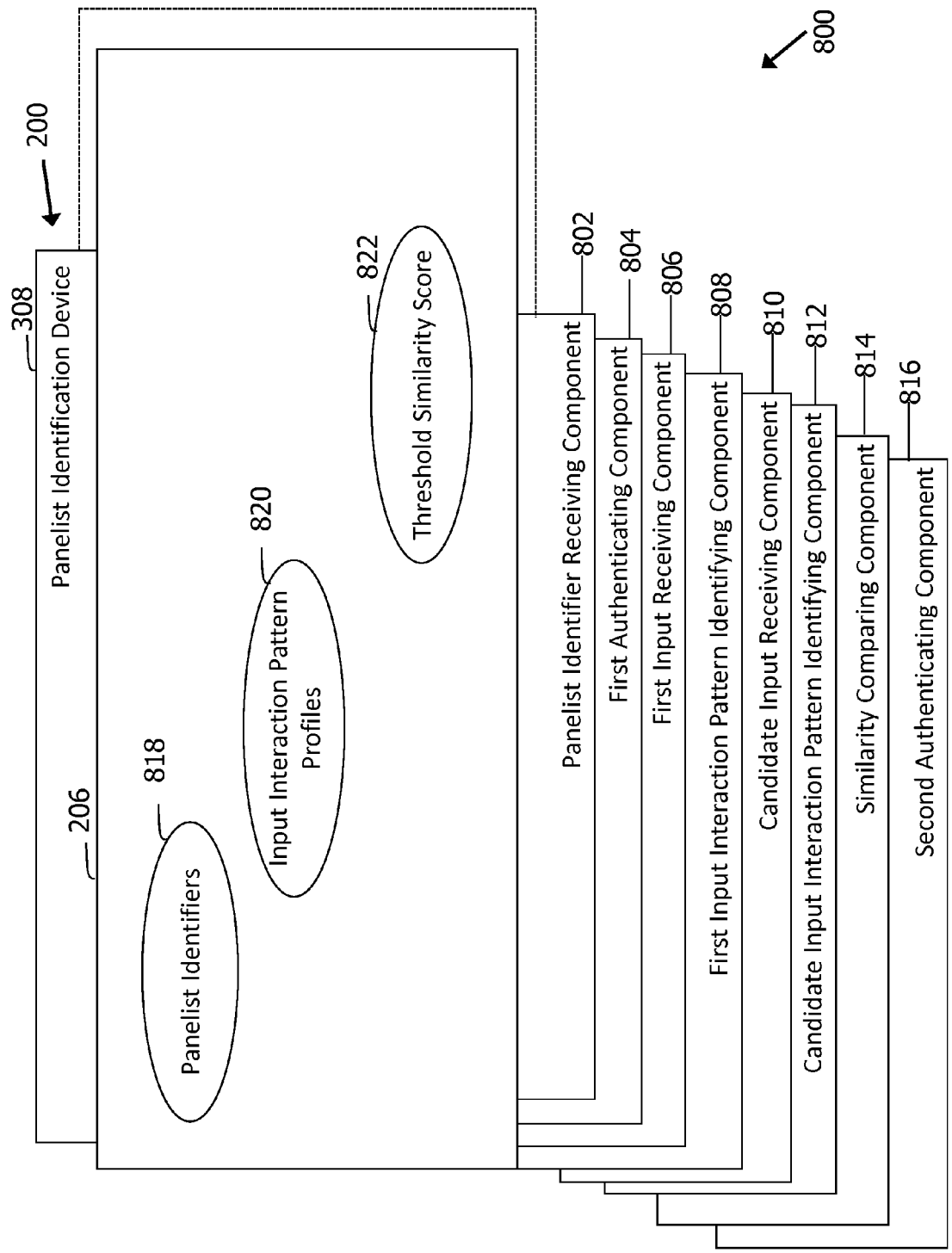
FIG. 8 is a diagram of components of one or more example computing devices that may be used in the environment shown in FIG. 1.

FIG. 8 is a diagram 800 of components of one or more example computing devices 200, that may be used in the environment shown in FIG. 1. For example, one or more of computing devices 200 may form panelist identification device 308. FIG. 8 further shows a configuration of sections of memory 206. Sections 818, 820, and 822 are coupled to several separate components within panelist identification device 308, which perform specific tasks.

Panelist identification device 308 includes a panelist identifier receiving component 802 for receiving a first panelist identifier from a first panelist at a first time. Additionally, panelist identification device 308 includes a first authenticating component 804 for authenticating the first panelist to the panelist reporting system based on the first panelist identifier. Additionally, panelist identification device 308 includes a first input receiving component 806 for receiving at least a first input from the first panelist through the panelist input device while the first panelist is authenticated to the panelist reporting system. Additionally, panelist identification device 308 includes a first input interaction pattern identifying component 808 for identifying a first input interaction pattern of the first panelist based at least in part on the first input. Panelist identification device 308 also includes a candidate input receiving component 810 for receiving a candidate input at a second time through the panelist input device, wherein the second time is subsequent to the first time. Further, panelist identification device 308 includes a candidate input interaction pattern identifying component 812 for identifying a candidate input interaction pattern based on the candidate input. Additionally, panelist identification device 308 includes a similarity comparing component 814 for determining that the candidate input interaction pattern satisfies a threshold level of similarity to the first input interaction pattern. Further, panelist identification device 308 includes a second authenticating component 816 for authenticating the first panelist to the panelist reporting system in response to determining that the candidate input interaction pattern satisfies the threshold level of similarity to the first input interaction pattern.

In an exemplary embodiment, memory 206 includes a plurality of sections, including but not limited to, a panelist identifiers section 818, an input interaction pattern profiles section 820, and a threshold similarity score section 822. These sections within memory 206 are interconnected for use in performing the operations described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of the above description may present features in terms of algorithms and symbolic representations of operations on information. Such algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A panelist identification device for determining an identity of a panelist based on an input interaction pattern of the panelist, said panelist identification device comprising a processor coupled to a panelist input device, said panelist identification device is communicatively coupled to a panelist reporting system, said processor is configured to:
   receive a first panelist identifier from a first panelist at a first time;
   authenticate the first panelist to the panelist reporting system based on the first panelist identifier;
   while the first panelist is authenticated to the panelist reporting system, receive at least a first input from the first panelist through the panelist input device;
   identify a first input interaction pattern of the first panelist based at least in part on the first input;

generate a first panelist input interaction pattern profile by averaging attributes from a plurality of input interaction patterns including the first input interaction pattern associated with the first panelist identifier;
receive a candidate input at a second time through the panelist input device, wherein the second time is subsequent to the first time;
identify a candidate input interaction pattern based on the candidate input;
determine that the candidate input interaction pattern satisfies a predefined threshold level of similarity to the first input interaction pattern by:
  determining a similarity score by comparing the candidate input interaction pattern to the first panelist input interaction pattern profile; and
  determining that the similarity score exceeds the predefined threshold level of similarity; and
authenticate the first panelist to the panelist reporting system in response to determining that the candidate input interaction pattern satisfies the threshold level of similarity to the first input interaction pattern.

2. The panelist identification device of claim 1, further configured to receive the candidate input at the second time through the panelist input device when the first panelist is not authenticated to the panelist reporting system.

3. The panelist identification device of claim 1, further comprising a statistical classification device that determines that the candidate input interaction pattern satisfies the predefined threshold level of similarity to the first input interaction pattern using a statistical model.

4. The panelist identification device of claim 1, further comprising a statistical classification device, said panelist identification device is further configured to:
  train the statistical classification device to identify the first panelist based on at least the first input and the first panelist identifier; and
  train the statistical classification device to identify a second panelist based at least on second input received through the panelist input device while the second panelist is authenticated to the panelist reporting system.

5. The panelist identification device of claim 1, further configured to identify the first input interaction pattern by identifying a typing speed.

6. The panelist identification device of claim 1, further configured to identify the first input interaction pattern by identifying a length of swipes through a touchscreen included in the panelist input device.

7. The panelist identification device of claim 1, further configured to identify the first input interaction pattern by identifying a frequency of typographical errors generated through inputs received through the panelist input device.

8. The panelist identification device of claim 1, further configured to identify the first input interaction pattern by identifying a movement speed of a pointing device included in the panelist input device.

9. The panelist identification device of claim 1, further configured to identify the first input interaction pattern by identifying a speed that a double tap or double click is performed through the panelist input device.

10. The panelist identification device of claim 1, further configured to identify the first input interaction pattern by identifying a speed of clicks performed through the panelist input device.

11. The panelist identification device of claim 1, further configured to identify a fingerprint or thumbprint through the panelist input device.

12. A method for determining an identity of a panelist based on an input interaction pattern of the panelist, the method is implemented by a panelist identification device comprising a processor coupled to a panelist input device, the panelist identification device is communicatively coupled to a panelist reporting system, the method comprising:
  receiving, by the panelist identification device, a first panelist identifier from a first panelist at a first time;
  authenticating, by the panelist identification device, the first panelist to the panelist reporting system based on the first panelist identifier;
  while the first panelist is authenticated to the panelist reporting system, receiving, by the panelist identification device, at least a first input from the first panelist through the panelist input device;
  identifying, by the panelist identification device, a first input interaction pattern of the first panelist based at least in part on the first input;
  generating, by the panelist identification device, a first panelist input interaction pattern profile by averaging attributes from a plurality of input interaction patterns including the first input interaction pattern associated with the first panelist identifier;
  receiving, by the panelist identification device, a candidate input at a second time through the panelist input device, wherein the second time is subsequent to the first time;
  identifying, by the panelist identification device, a candidate input interaction pattern based on the candidate input;
  determining, by the panelist identification device, that the candidate input interaction pattern satisfies a predefined threshold level of similarity to the first input interaction pattern by:
    determining a similarity score by comparing the candidate input interaction pattern to the first panelist input interaction pattern profile; and
    determining that the similarity score exceeds the predefined threshold level of similarity; and
  authenticating, by the panelist identification device, the first panelist to the panelist reporting system in response to determining that the candidate input interaction pattern satisfies the threshold level of similarity to the first input interaction pattern.

13. The method of claim 12, further comprising receiving the candidate input at the second time through the panelist input device when the first panelist is not authenticated to the panelist reporting system.

14. The method of claim 12, further comprising determining, by a statistical classification device, the candidate input interaction pattern satisfies the predefined threshold level of similarity to the first input interaction pattern using a statistical model.

15. The method of claim 12, wherein the panelist identification device includes a statistical classification device, said method further comprising:
  training the statistical classification device to identify the first panelist based on at least the first input and the first panelist identifier; and
  training the statistical classification device to identify a second panelist based at least on second input received through the panelist input device while the second panelist is authenticated to the panelist reporting system.

16. The method of claim 12, further comprising identifying the first input interaction pattern by identifying a typing speed.

17. The method of claim 12, further comprising identifying the first input interaction pattern by identifying a length of swipes through a touchscreen included in the panelist input device.

18. A computer-readable storage device having processor-executable instructions embodied thereon, for determining an identity of a panelist based on an input interaction pattern of the panelist, wherein when executed by a panelist identification device that includes a processor coupled to a panelist input device and communicatively coupled to a panelist reporting system, the processor-executable instructions cause the panelist identification device to:

receive a first panelist identifier from a first panelist at a first time;

authenticate the first panelist to the panelist reporting system based on the first panelist identifier;

while the first panelist is authenticated to the panelist reporting system, receive at least a first input from the first panelist through the panelist input device;

identify a first input interaction pattern of the first panelist based at least in part on the first input;

generate a first panelist input interaction pattern profile by averaging attributes from a plurality of input interaction patterns including the first input interaction pattern associated with the first panelist identifier;

receive a candidate input at a second time, subsequent to generating the first panelist input interaction pattern profile; and determine that the candidate input was entered by the first panelist based on the first input interaction pattern by:

identifying a candidate input interaction pattern based on the candidate input;

determining a similarity score by comparing the candidate input interaction pattern to the first panelist input interaction pattern profile; and determining that the similarity score exceeds a predefined threshold level of similarity.

* * * * *